United States Patent
Barone et al.

(10) Patent No.: US 7,382,917 B2
(45) Date of Patent: Jun. 3, 2008

(54) METHODS AND APPARATUS FOR TEXTURE COMPRESSION AND COMPUTER PROGRAM PRODUCT THEREFOR

(75) Inventors: Massimiliano Barone, Bresso (IT); Andrea Vitali, Bergamo (IT); Danilo Pietro Pau, Sesto San Giovanni (IT); Daniele Sirtori, Milan (IT); Daniele Lavigna, Locate Triulzi (IT); Pierluigi Gardella, Montanaso Lombardo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 846 days.

(21) Appl. No.: 10/756,165

(22) Filed: Jan. 12, 2004

(65) Prior Publication Data

US 2004/0156542 A1 Aug. 12, 2004

(30) Foreign Application Priority Data

Jan. 31, 2003 (EP) .................................. 03002205

(51) Int. Cl.
*G06K 9/00* (2006.01)
(52) U.S. Cl. ...................................... 382/166; 358/518
(58) Field of Classification Search ................. 382/166
See application file for complete search history.

(56) References Cited

U.S. PATENT DOCUMENTS

| 6,269,181 B1 * | 7/2001 | Acharya ...................... 382/162 |
| 6,819,793 B1 * | 11/2004 | Reshetov et al. ........... 382/166 |
| 2004/0081356 A1 * | 4/2004 | Shimizu et al. ............. 382/166 |

FOREIGN PATENT DOCUMENTS

| WO | WO 99/18537 | 4/1999 |
| WO | WO 99/22519 | 5/1999 |

OTHER PUBLICATIONS

Delp, et. al. "Image Compression Using Block Truncation Coding" IEEE Transactions on Communications, vol. COM-27, No. 9, Sep. 1979, New York, pp. 1335-1342.
Campbell, et al. "Two Bit/Pixel Full Color Encoding" Computer Graphics, vol. 20, No. 4, Aug. 1986, New York, pp. 215-219.
Ivanov, et al. "Color Distribution—a new approach to texture compression" Computer Graphics Forum, Eurographics 2000, vol. 19 (2000), No. 3, Aug. 21, 2000, Amsterdam, NL, pp. C283-C289, C535.
Pei, et al. "A Novel Block Truncation Coding of Color Images Using a Quaternion-Moment-Preserving Principle" IEEE Inc., vol. 45, No. 5, May 1, 1997, New York, pp. 583-595.
Kugler, "High-performance texture decompression hardware" The Visual Computer, vol. 13, No. 2, 1997, Berlin, DE, pp. 51-63.

* cited by examiner

*Primary Examiner*—Samir A Ahmed
*Assistant Examiner*—Aklilu k Woldemariam
(74) *Attorney, Agent, or Firm*—Hogan & Hartson LLP

(57) ABSTRACT

A method for texture compressing images having a plurality of color components (R, G, B) includes defining color representatives for use in encoding by defining groups of colors for each color component (R,G,B), and selecting a representative median color for the group. Each group ideally includes 3 to 15 increasing colors. The method includes computing, for each group, an error between each member of the group and the representative median color of the group. Typically, the error is computed as the sum of the absolute differences (SAD) between each member of the group and the representative median color of the group.

21 Claims, 3 Drawing Sheets

METHODS AND APPARATUS FOR TEXTURE COMPRESSION AND COMPUTER PROGRAM PRODUCT THEREFOR

BACKGROUND OF THE INVENTION

1. Field of the Invention

The present invention relates to texture compression techniques.

2. Background of Invention

Compression and decompression intended to minimize the memory size needed to store 2D textures is a promising field of application for these techniques in the 3D graphic domain. This possible field of use is becoming more and more significant as the dimensions and number of these textures tend to increase in real applications. The level of detail tends to increase as required by some applications, such as 3D games, and, without the help of such techniques, memory size and bandwidth for access would tend to require increasing performance levels hardly sustainable in mobile, ultra low power, handheld systems. More to the point, these techniques are becoming increasingly important in wireless phone architectures with 3D games processing capabilities.

For example, assuming a texture dimension of 512×512 pixels 16 bit/color each and a depth of 3, the amount of memory needed is 1.5 M bytes. Assuming 20-30 frames per second, the memory bandwidth is 30 to 45 Mbytes/s.

Additional background information on this topic can be gathered from "Real-Time Rendering" by Tomas Akenine-Möller and Eric Haines, A. K. Peters Ltd, $2^{nd}$ edition, ISBN 1568811829.

A well-known solution in this scenario was developed by the company S3; the related algorithm is designated S3TC (where TC stands for Texture Compression).

This has become a widely used de-facto standard and is included in the Microsoft DirectX libraries with adhoc API support.

Compression is performed off-line at compile time and the textures are stored in the main memory. Decompression processes act to compress textures accessing the memory run-time. This means that only decompression is implemented in hardware form while compression is not.

Important parameters for the decompression engine are: steps needed to decompress textures and possible parallel operation; low latency between data-access-from-memory and data-out-from the decompression engine.

In order to better understand operation of the S3TC algorithm one may refer to an image in RGB format, where each color component R (Red) or G (Green) or B (Blue) is a sub-image composed by N pixels in the horizontal dimension and M pixels in vertical dimension. If each color component is coded with P bits, the number of bits per image is N*M*3*P.

For example, assuming N=M=256 and P=8, then the resulting size is 1,572,864 bits. If each sub-image R or G or B is decomposed in not-overlapped blocks of Q pixels in the horizontal dimension and S pixel in the vertical dimension, the number of blocks per sub-image is (N*M)/(Q*S) while per image is [3(NM/(Q*S)(WM)] and the number of bits per block is [3*(Q*S)]*P. If, for example Q=S=4 and P=8, then the resulting size of each block is 384 bits. If the number of bits per channel is R=5, G=6, B=5 then the resulting size of each block per image is (4*4)*(5+6+5)=256 bits. The S3TC algorithm is able to compress such an amount of data by 6 times when R=8, G=8, B=8 and 4 times when R=5, G=6, B=5. 64 bits compose the resulting compressed block always sent to decompression stage. This number is the results of the coding steps described below assuming Q=S=4.

To sum up, operation of the S3TC algorithm may be regarded as comprised of the following steps:

i) Decompose the R G B image in non overlapped Q=4*S=4 blocks of R G B colors ii) Consider the following block composed by 16 pixels each one composed by R, G and B color components:

$Pij = R_{ij} \cup G_{ij} \cup B_{ij}$ (this denotes the pixel at the ij position the R G B image, and U is the union operator)

| (R11 G11 B11) | (R12 G12 B12) | (R13 G13 B13) | (R14 G14 B14) |
| (R21 G21 B21) | (R22 G22 B22) | (R23 G23 B23) | (R24 G24 B24) |
| (R31 G31 B31) | (R32 G32 B32) | (R33 G33 B33) | (R34 G34 B34) |
| (R41 G41 B41) | (R42 G42 B42) | (R43 G43 B43) | (R44 G44 B44) | iii) Decompose the block above in three sub-blocks called sub-block R, sub-block G and sub-block B as shown hereinbelow, each block including only one color component:

| | |
|---|---|
| R11 R12 R13 R14 | sub-block R |
| R21 R22 R23 R24 | |
| R31 R32 R33 R34 | |
| R41 R42 R43 R44 | |
| G11 G12 G13 G14 | sub-block G |
| G21 G22 G23 G24 | |
| G31 G32 G33 G34 | |
| G41 G42 G43 G44 | |
| B11 B12 B13 B14 | sub-block B |
| B21 B22 B23 B24 | |
| B31 B32 B33 B34 | |
| B41 B42 B43 B44 | | as shown in FIG. 1.

Specifically, FIG. 1 shows RGB blocks ordered in different planes, with a RGB block shown on the left and a corresponding de-composition shown on the right.

iv) Sort in ascending order each sub-block color v) Detect the black color, which is a pixel made of R=0 and G=0 and B=0 vi) If the black color is not detected, then set a color palette made by a. 1st color is the minimum value of sub-block R, minimum value of sub-block G, minimum value of sub-block B.

b. 2nd color is the maximum value of sub-block R, maximum value of sub-block G, maximum value of sub-block B c. $3^{rd}$ is composed by (2*min R+max R)/3, (2*min G+max G)/3, (2*min B+max B)/3 d. $4^{th}$ is composed by (min R+2*max R)/3, (min G+2*max G)/3, (min B+2*max B)/3 vii) Otherwise, if black color is detected then set a color palette made by a. $1^{st}$ color is minimum value of sub-block R, sub-block G, sub-block B where each of them must not be equal to zero (the black color component) at the same time b. $2^{nd}$ color is maximum value of sub-block R, sub-block G, sub-block B c. $3^{rd}$ is composed by (min R+max R)/2, (min G+max G)/2, (min B+max B)/2 d. $4^{th}$ is the black color that has R,G,B components equal to zero viii) If black color is not detected, define the look-up color palette as Look-up table = [ MinR,  Int1R,  Int2R,  MaxR ]
               [ MinG,  Int1G,  Int2G,  MaxG ]
               [ MinB,  Int1B,  Int2B,  MaxB ]

If black color is detected define the color palette as

Look-up table = [ MinR,  Int1R,  MaxR  0 ]
               [ MinG,  Int1G,  MaxG  0 ]
               [ MinB,  Int1B,  MaxB  0 ]

ix) Associate the following 2 bits code (in boldface, under the palette) to each column of the above palette Look-up table = [ MinR,  Int1R,  Int2R,  MaxR ]
               [ MinG,  Int1G,  Int2G,  MaxG ]
               [ MinB,  Int1B,  Int2B,  MaxB ]
                 00     01      10      11

Look-up table = [ MinR,  Int1R,  MaxR  0 ]
               [ MinG,  Int1G,  MaxG  0 ]
               [ MinB,  Int1B,  MaxB  0 ]
                 00     01      10     11 x) For each $P_{ij}=R_{ij} \cup G_{ij} \cup B_{ij}$ (where i ranges from 1 to Q=4 and j ranges from 1 to S=4) compute the Euclidean distance Dist between it and each look-up color as defined above in vi.a,b,c,d or vii.a,b,c,d depending if black color has been detected or not. Note that the difference is within a homologue color component (between R or G or B).

$$Dist1=\sqrt{(|R_{ij}-MinR|^2+|G_{ij}-MinG|^2+|B_{ij}-MinB|^2)}$$

$$Dist2=\sqrt{(|R_{ij}-Int1R|^2+|G_{ij}-Int1G|^2+|B_{ij}-Int1B|^2)}$$

$$Dist3=\sqrt{(|R_{ij}-Int2R|^2+|G_{ij}-Int2G|^2+|B_{ij}-Int2B|^2)}$$

$$Dist4=\sqrt{(|R_{ij}-MaxR|^2+|G_{ij}-MaxG|^2+|B_{ij}-MaxB|^2)}$$

xi) For each $P_{ij}=R_{ij} \cup G_{ij} \cup B_{ij}$ find the minimum distance among Dist1, Dist2, Dist3 and Dist4. For example let this be Dist1.

xii) Send to a decoder process the code associated to the color enclosed in the look-up table that has the minimum distance. If it is Dist1 then the code is 00.

xiii) The decoder receives for each Q*S block as shown in FIG. 2
   a. 2 bits code for each Pij that are addresses to the look-up table
   b. MinR MinG MinB
   c. MaxR MaxG MaxB xiv) If Min is received before Max by the decoder, then black has been detected by the encoder otherwise not xv) As shown in FIG. 2, the decoder operates as described in steps vi or vii depending on black color detection
   a. Int1R Int1G Int1B
   b. Int2R Int2G Int2B xvi) As shown in FIG. 2, the decoder addresses a look-up table with 2 bits code associated to each Pij and replaces it with the color stored in the look-up table color palette. Specifically ST, LUT, and CT indicate the source text, the look-up table, and the compressed text, respectively.

FIG. 3 shows how the data sent to the decoder are arranged in a bitstream and if the black color is not detected, while FIG. 4 shows the opposite case.

As stated before, the compression ratio is 6:1 or 4:1. This is because if colors are in R=8 G=8 B=8 format then 384 bits are coded with 64 (384/64=6) and if colors are in R=5 G=6 B=5 format then 256 bits are coded with 64 (256/64=4).

As shown in FIGS. 3 and 4, the sum of all the bits amounts to 64.

SUMMARY OF THE INVENTION

However satisfactory the prior art solution considered in the foregoing may be, the need is felt for alternative texture compression/decompression techniques. The aim of the present invention is thus to provide such an alternative technique.

According to the present invention such an object is achieved by means of a method having the features set forth in the claims that follow. The invention also encompasses the decoding process as well as corresponding apparatus in the form of either a dedicated processor or a suitably programmed general-purpose computer (such as a DSP). In that respect the invention also relates to a computer program product directly loadable into the memory of a digital computer and including software code portions for performing the method of the invention when the product is run on a computer.

In brief, the presently preferred embodiment of the invention differs, in one of its aspects, from the S3TC algorithm in the way the reference colors are selected to construct the look-up table. The way of choosing these colors is made adaptive and consists in creating groups of colors for each color component R,G,B and select at first a group from which a representative color for this group is derived. Preferably, each group is composed by any number of colors between 3 up to 15 members. For each of them the median color is chosen as the representative color of the group to which it belongs. For sake of clarity, the median of a set of numbers put in ascending order is the number located in the middle position of them.

For example if the set is (1, 3, 5, 6, 20) then the median is the $3^{rd}$ value (from right) and is equal to 5.

For each group, an error is computed as the sum of the absolute differences (SAD) between each group member and the representative (the median value of the group) color.

Still preferably, at least two different criteria are used to select the group first and then extract from this group a representative color.

The former is to select the group that minimizes the error as defined before, assuming each group comprised of the lower colors sorted in ascending order. The same applies for the groups comprised of the higher colors.

The latter accrues the error computed separately for the two groups in all possible combinations and then provides for finding the minimum of the composite error.

Groups that include only the minimum color or the maximum color are not considered during the processing which are, instead, the reference colors for S3TC.

The arrangement disclosed herein detects black colors. Also the encoding steps, the bitstream composition and the decoding steps are different if compared to S3TC.

BRIEF DESCRIPTIONS OF THE DRAWINGS

The invention will now be described, by way of example only, with reference to the annexed figures of drawing, wherein:

FIGS. 1 to 4 pertain to the prior as described above;

DETAILED DESCRIPTION

The presently preferred embodiment of the invention differs, in one of its aspects, from the S3TC algorithm in the way the reference colors are selected to construct the look-up table. The way of choosing these colors is made adaptive and consists in creating groups of colors for each color component R,G,B and select at first a group from which a representative color for this group is derived. Preferably, each group is composed by any number of colors between 3 up to 15 members. For each of them the median color is chosen as the representative color of the group to which it belongs. For sake of clarity, the median of a set of numbers put in ascending order is the number located in the middle position of them.

For example if the set is (1, 3, 5, 6, 20) then the median is the $3^{rd}$ value (from right) and is equal to 5.

For each group, an error is computed as the sum of the absolute differences (SAD) between each group member and the representative (the median value of the group) color.

Still preferably, at least two different criteria are used to select the group first and then extract from this group a representative color.

The former is to select the group that minimizes the error as defined before, assuming each group comprised of the lower colors sorted in ascending order. The same applies for the groups comprised of the higher colors.

The latter accrues the error computed separately for the two groups in all possible combinations and then provides for finding the minimum of the composite error.

Groups that include only the minimum color or the maximum color are not considered during the processing which are, instead, the reference colors for S3TC.

The arrangement disclosed herein detects black colors. Also the encoding steps, the bitstream composition and the decoding steps are different if compared to S3TC.

An embodiment of the invention will now be described by using the approach previously adopted for describing the S3TC arrangement and assuming Q=S=4.

i) Decompose the R G B image in non overlapped Q=4 S=4 blocks of R G B colors ii) Consider the following 4×4 block composed of 16 pixels each one composed by R, G and B components:

$P_{ij} = R_{ij} \cup G_{ij} \cup B_{ij}$ (this again denotes the pixel at the ij position in the R G B image, where U is the union operator)

Figure 1:
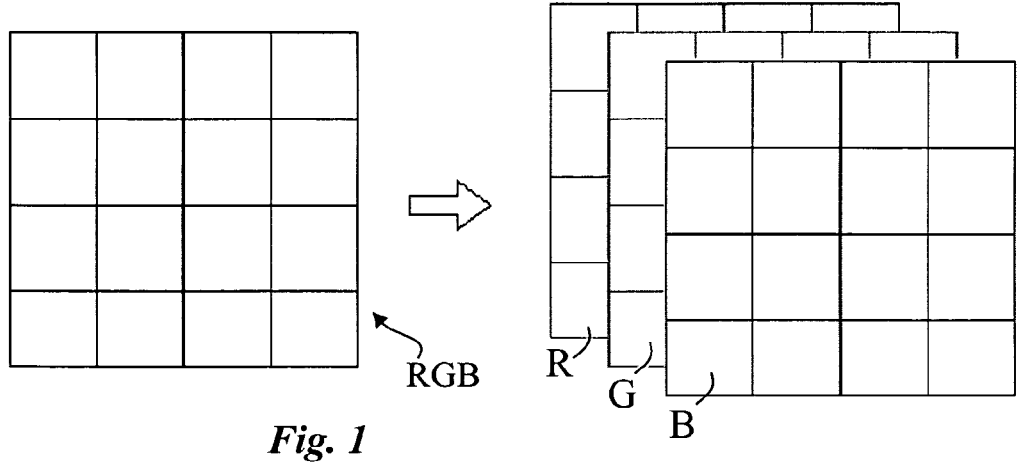
Figure 2:
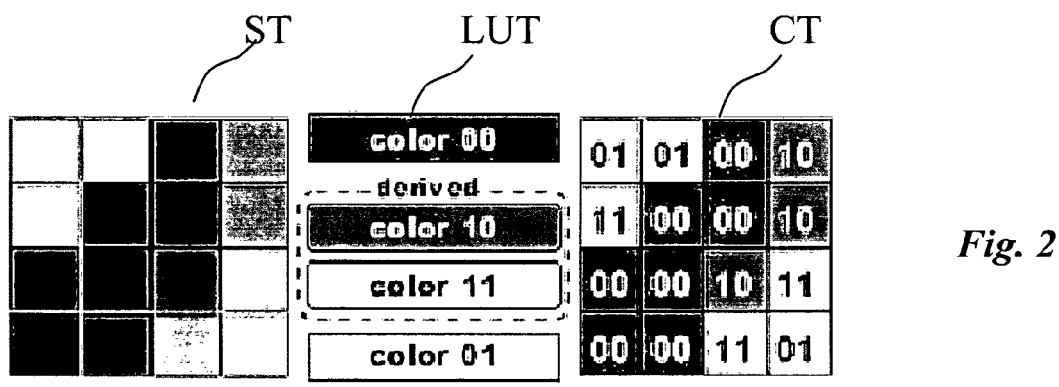
Figure 5:
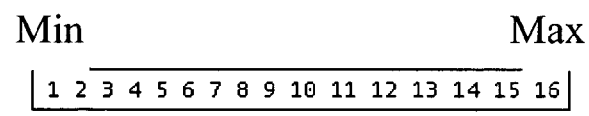
FIG. 5 shows R or G or B sub-blocks sorted from left to right in ascending order in a possible embodiment of the invention.
Figure 6:
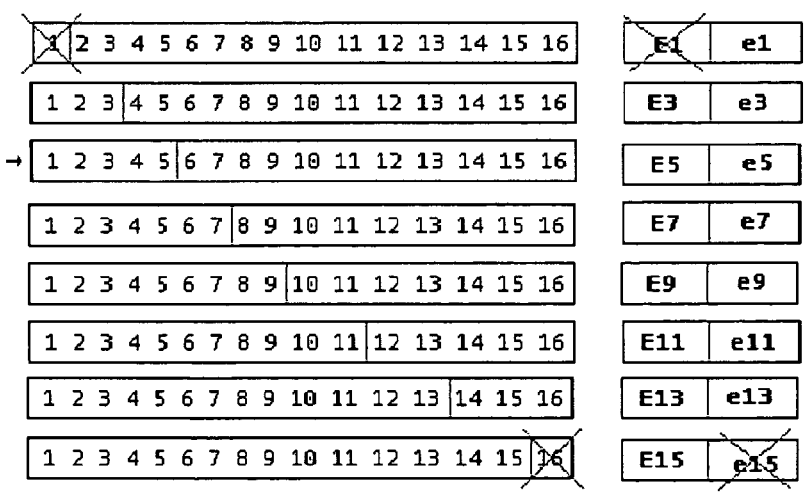
FIG. 6 shows examples of groups in respective sets as well as examples of computed errors.

| (R11 G11 B11) | (R12 G12 B12) | (R13 G13 B13) | (R14 G14 B14) |
| (R21 G21 B21) | (R22 G22 B22) | (R23 G23 B23) | (R24 G24 B24) |
| (R31 G31 B31) | (R32 G32 B32) | (R33 G33 B33) | (R34 G34 B34) |
| (R41 G41 B41) | (R42 G42 B42) | (R43 G43 B43) | (R44 G44 B44) | iii) Decompose the block above in three sub-blocks called sub-block R, sub-block G and sub-block B each block including only a color component:

| R11 R12 R13 R14 | sub-block R |
| R21 R22 R23 R24 | |
| R31 R32 R33 R34 | |
| R41 R42 R43 R44 | |
| G11 G12 G13 G14 | sub-block G |
| G21 G22 G23 G24 | |
| G31 G32 G33 G34 | |
| G41 G42 G43 G44 | |
| B11 B12 B13 B14 | sub-block B |
| B21 B22 B23 B24 | |
| B31 B32 B33 B34 | |
| B41 B42 B43 B44 | | iv) Sort in ascending order each sub-block color R, G, B as shown in FIG. 5. Each number is the position in ascending order that addresses each color component R,G,B v) Define two sets, each set including some groups of color for each R, G, B component independently. The left-hand portion of FIG. 6 shows the yellow set and the red set as an example of such groups for a given color component. In the yellow set, each group includes an increasing number of colors starting from the minimum on the left and excluding the group with only the lowest color (marked with X). In the red set, each group includes a decreasing number of colors starting form the maximum on the right and excluding the group with only the highest color (marked with X).

vi) For each group, compute the error as the sum of absolute differences (SAD) between its median color and each color composing the group. Referring to the right hand portion of FIG. 6, Ei is such error associated to the yellow set (where i ranges from 1 to the number of groups belonging to yellow set) and ej (where j ranges from 1 to the number of groups belonging to red set) is the error associated to red set, where i or j is the index to address each group in the respective set vii) Two sets of errors are computed, Ei and ej. Selection of the yellow group and red group (and then depending on which one is selected, the median is taken as the representative color) can occur in two ways:

a) the yellow group is the one that has the minimum error between all Ei's and the red group is the one that has the minimum error between all ej's b) all possible combinations of Ei+ej are computed first and then the global minimum value is found. This will select at the same time—and not separately as before—a yellow and red group that has the error that minimizes the Ei+ej number. For example E7+e11 being the minimum implies the selection of 4th element as min_median reference and 14th element as max_median reference for next encoding steps viii) The color representatives as defined in step vii) will be used to set the encoding step.

If the black color is detected, step vi) is modified in such a way that each group of color does not include the black.

The basic scheme described in the foregoing lends itself to a numbers of variants.

Figure 7:
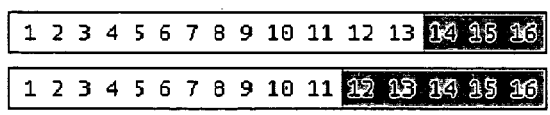
FIGS. 7 and 8 show possible variants of the arrangement described herein.
Figure 3:
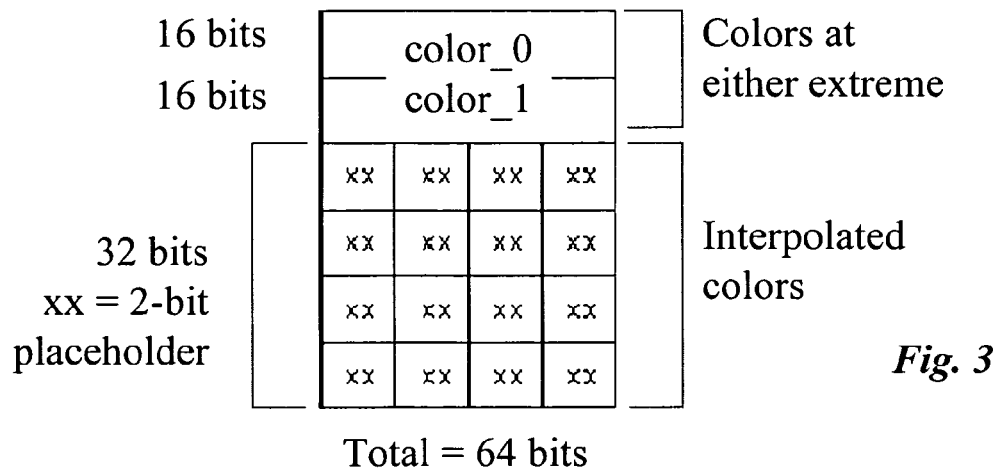
Figure 4:
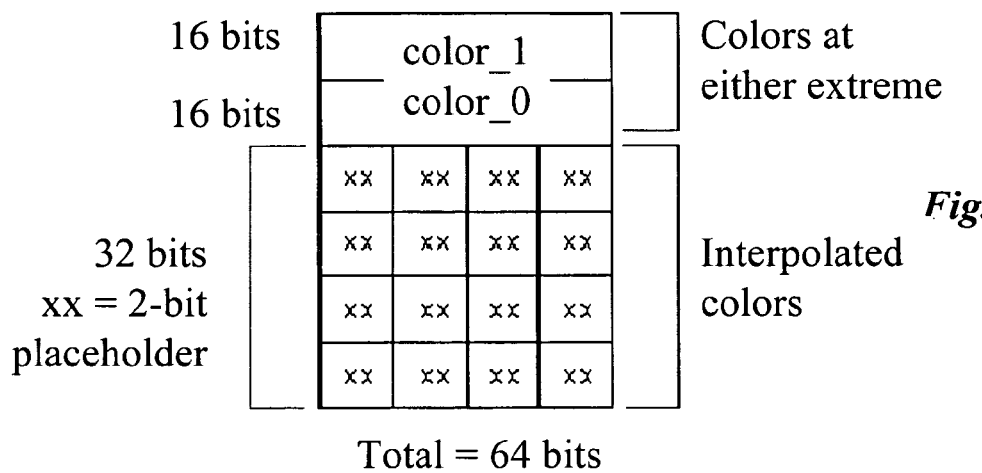

A first variant has only two groups of colors of 3 and 5 elements as shown in FIG. 7.

Depending on the criteria a) and b) assumed in the previous section vii two additional variants can be defined.

In particular, referring to FIG. 7, in the first of these additional variants:

If E3<=E5 min_median reference1=element 2, else min_median reference1=element 3, If e3<=e5 max_median reference2=element 15 else max_median reference2=element 14

In the second variant:

If minimum is E3+e3 then min_median reference 1=element 2 and max_median reference2=element 15

If minimum is E3+e5 then min_median reference 1=element 2 and max_median reference2=element 14

If minimum is E5+e3 then min_median reference 1=3 and max_median reference2=element 15

If minimum is E5+e5 then min_median reference 1=3 and max_median reference2=element 14

Figure 8:
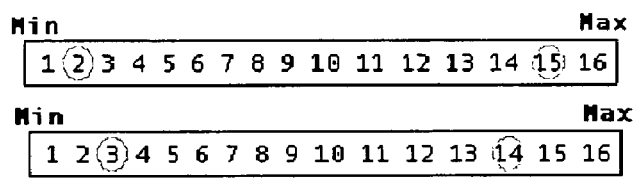

A further additional variant takes always as min_medianreference1 equal to the second element and as max_median_reference_2 equal to the 15$^{th}$, while another additional variant takes always as min_median reference 1 the 3$^{rd}$ element and max_median as reference 2 the 14$^{th}$ as shown in FIG. 8 where the first row is related to STM-TC3 and the second is related to STM-TC 5.

At the end of above described variants, each one produces as a result two reference colors named:

1) min_medianR U min_medianG U min_medianB
2) max_medianR U max_medianG U max_medianB where U is the union operator grouping them as a whole pixel.

Next, the proposed method computes a value called length as follows.

If the black colour (which is a pixel made of R=0 and G=0 and B=0) has not been detected:

$$Length\_R=(max\_medianR-min\_medianR)/6$$

$$Length\_G=(max\_medianG-min\_medianG)/6$$

$$Length\_B=(max\_medianB-min\_medianB)/6$$

$$Length=\sqrt{(|Length\_R|^2+|Length\_G|^2+|Length\_B|^2)}$$

where max_medianR,G,B and min_medianR,G,B are the representative colors for each selected group belonging to the red and yellow sets.

This is the maximum quantization error the method can compute when Pij colors are quantized during the encoding step, here described.

If the black color is not detected for each Pij=$R_{ij}$ U $G_{ij}$ U $B_{ij}$ (where i range is from 1 to Q=4 and j range is from 1 to S=4) compute the Euclidean distance $$Dist\_ij=\sqrt{(|R_{ij}-min\_medianR|^2+|G_{ij}-min\_medianG|^2+|B_{ij}-min\_medianB|^2)}$$

Now the encoder quantizes each color as follows:

if Dist_ij<=(Length) send to the decoder the code 00 if (Length)<Dist_ij<=3*Length send to the decoder the code 01 if (3*Length)<Dist_ij<=5*Length send to the decoder the code 10 if Dist_ij>5*Length send to the decoder the code 11

When a block is encoded, the decoder receives a 2 bits code for each Pij as above defined, plus min_medianR U min_medianG U min_medianR plus length_R, length_G, length_B Conversely, if the encoder detects the black color, then $$Length\_R=(max\_medianR-min\_medianR)/4$$

$$Length\_G=(max\_medianG-min\_medianG)/4$$

$$Length\_B=(max\_medianB-min\_medianB)/4$$

$$Length=\sqrt{(|Length\_R|^2+|Length\_G|^2+|Length\_B|^2)}$$

for each Pij=$R_{ij}$ U $G_{ij}$ U $B_{ij}$ (where i range is from 1 to Q=4 and j range is from 1 to S=4) quantize them as follows:

compute Dist $ij=\sqrt{(|R_{ij}-min\_medianR|^2+|G_{ij}-min\_medianG|^2+|B_{ij}-min\_medianB|^2)}$ if $R_{ij}$=Gij=Bij=0 send to the decoder the code 00 else if $R_{ij}$ or Gij or Bij not equal to 0 if Dist ij<=(Length) send to the decoder the code 01 if (Length)<Dist ij<=3*Length send to the decoder the code 10 if (3*Length)<Dist ij send to the decoder the code 11

When a block is encoded the decoder receives 2 bits code for each Pij as above defined, plus min_medianR U min_medianG U min_medianR after length_R, length_B, length_B If decoder receives min_medianR U min_medianG U min_medianR before length_R, length_B, length_B this means that the black color is not detected so the output colors will be if the code is 00
Rij=min_medianR
Gij=min_medianG
Bij=min_medianB if the code is 01
Rij=min_medianR+2*length_R
Gij=min_medianG+2*length_G
Bij=min_medianB+2*length_B if the code is 10
Rij=min_medianR+4*length_R
Gij=min_medianG+4*length_G
Bij=min_medianB+4*length_B if the code is 11
Rij=min_medianR+6*length_R
Gij=min_medianG+6*length_G
Bij=min_medianB+6*length_B If the decoder receives Min_medianR U min_medianG U min_medianR after length_R, length_B, length_B it means that black color is detected so the output colors will be if the code is 00
Rij=0
Gij=0
Bij=0 if the code is 01
Rij=min_medianR
Gij=min_medianG
Bij=min_medianB if the code is 10
Rij=min_medianR+2*length_R
Gij=min_medianG+2*length_G
Bij=min_medianB+2*length_B if the code is 11
Rij=min_medianR+4*length_R
Gij=min_medianG+4*length_G
Bij=min_medianB+4*length_B The various arrangements described in the foregoing have been applied to the following standard images by using two formats: RGB 565 and RGB 888, where 5, 6 or 8 is the number of bits per color channel.

1. 256×256 (horizontal×vertical size dimension)
   Abstrwav
   Chapt
   Forest
   Intel
   Pixtest
   Reference
   Teleport
   Topsmap
2. 512×512 (horizontal×vertical size dimension)
   Donut
3. 512×1024 (horizontal×vertical size dimension)
   Face
4. 640×480 (horizontal×vertical size dimension)
   Balloon
5. 1024×768 (horizontal×vertical size dimension)
   Yahoo These pictures are a representative set on which texture compression is typicaly applied.

All the pictures are in true-color format or 888, while the 565 format is obtained from the 888 format by truncating the 323 lowest bits of the 888 pictures. Alternative truncating methods can be used to go from 888 to 565 such as rounding to nearest integer, Floyd-Steinberg dithering etc. These do not imply any changes in the arrangement disclosed herein.

To evaluate the performance of each arrangement, visual assessments and objective measures can be performed. In particular two parameters are taken as reference measures:
   mean square error (MSE), and
   peak signal/noise ratio (PSNR) for each RGB channel.

Figure 9:
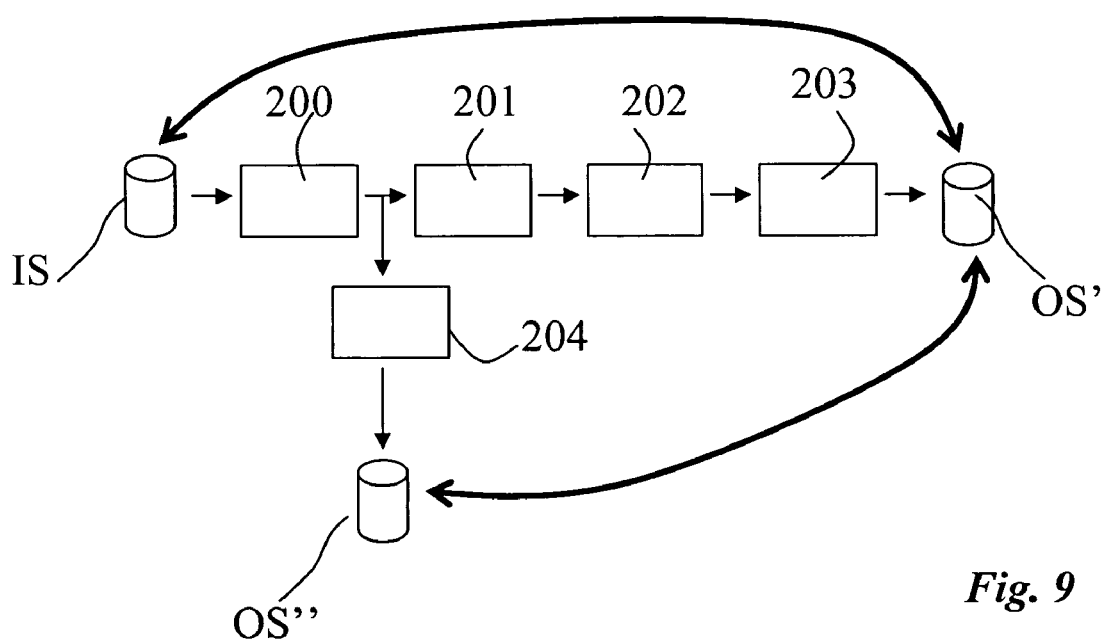
FIG. 9 is a block diagram of a pipeline arrangement to evaluate the performance of the compression and decompression techniques described herein.

FIG. 9 shows how the measures are taken within the simulation environment.

Input images IS in the 888 format (called Source888) are converted at 200 into the 565 format (called Source565), then compressed at 201 and further decompressed at 202 to the 565 format. These are back converted at 203 into the 888 format to generate a first set of output images OS' (also called Decoded888).

The Source-565 images from block 200 are back converted into 888 at 204 to generate a second set of output images OS" to be used as a reference (called Source565to888).

A first set of PSNR values (called PSNR 888) are computed between the Source 888 IS and the Decoded888 OS' images. A second set of PSNR (called PSNR 565) values are computed between the Source565to888 OS" and the Decoded888 OS' images.

In particular, 565 images are back reported to 888 by simple zero bit stuffing of the 323 least significant positions.

How the Source888 IS images are converted to the 565 format and back to the 888 foamt corresponds to techniques that are well known to the experts in this area and do not need to be described in detail here:

$$MSE=(\Sigma|Pij-Paij|^2)/(w*h)$$

where:
   Pij=source color
   Paij=processed color
   w, h=image width, height $$PSNR=10\ \log_{10}[(2^{bpp}-1)^2/MSE]$$

where:
   bpp=bit per color

The results show that all the variants of the solution disclosed herein perform significantly better than S3TC in most tests.

Of course, the underlying principle of the invention remaining the same, the details and embodiments may vary, also significantly, with respect to what has been described and shown by way of example only, without departing from the scope of the invention as defined by the annexed claims.

We claim:

1. A method for texture compressing images having a plurality of color components (R, G, B), including defining color representatives for use in encoding, the method comprising:
   defining groups of colors for each said color component (R,G,B) for one of said images;
   selecting, for each said group of colors, a representative median color;
   computing a length value as a maximum quantization error adapted to be computed when pixel Pij colors are quantized during an encoding step;
   computing a Euclidean distance Dist ij=$\sqrt{(|R_{ij}-\text{min medianR}|^2+|G_{ij}-\text{min medianG}|^2+|B_{ij}-\text{min medianB}|^2)}$
   where Rij, Gij, Bij represent the color components of the pixel Pij at the position ij of said image and mim medianR, mim medianG and mim medianB represent the corresponding reference colors of the selected group for each color; and
   encoding each color as a function of said length value and said Euclidean distance.

2. The method of claim 1, wherein each said group comprises 3 to 15 colors.

3. The method of claim 1, wherein said median color is selected as a member of the respective group located in a middle position of the members of the group arranged in ascending order.

4. The method of claim 1, further comprising computing, for each said group of colors, an error between each member of the group and said representative color of the group.

5. The method of claim 4, wherein computing said error comprises summing the absolute differences (SAD) between each member of the group and said representative color of the group.

6. The method of claim 4, further comprising finding a minimum composite error.

7. The method of claim 1, further comprising excluding groups that include only a minimum color or a maximum color.

8. The method of claim 1, further comprising defining two sets, each set including some groups of color for each said color component (R, G, B) independently, wherein, in one of said two sets, each group includes an increasing number of colors starting from a minimum color and excluding a group with only a lowest color and, in the other of said sets, each group includes a decreasing number of colors starting from a maximum color and excluding a group with only a highest color.

9. The method of claim 4, further comprising:
   computing, for each group, said error between the median color and each color composing the group, whereby two sets of errors are computed (Ei and ej),
   selecting a first said group and a second said group wherein:
      said first group is the group with the minimum error of all the members of said first set of errors (Ei) and said second group is the one that has the minimum error of all the members of said second set of errors (ej); or all possible combinations of the errors of said first and second sets (Ei+ej) are computed, a global minimum value is found and said first and second groups are jointly selected as those corresponding to said global minimum.

10. The method of claim 1, further comprising defining only two groups of colors.

11. The method of claim 10, wherein said two groups comprise the yellow group and the red group.

12. The method of claim 10, wherein said two groups of colors include 3 and 5 members.

13. The method of claim 1, wherein said images are RGB color images and said color components are the R, G, and B components of said RGB image.

14. The method of claim 1, wherein if a black color is not detected, defining said length value (Length) as:

Length_$R$=(max_median$R$−min_median$R$)/6

Length_$G$=(max_median$G$−min_median$G$)/6

Length_$B$=(max_median$B$−min_median$B$)/6

Length=$\sqrt{(|Length\_R|^2+|Length\_G|^2+|Length\_B|^2)}$ where max_medianR,G,B and mim_medianR,G,B are the representative colors for each selected group belonging to said sets for said color components (R, G, B) and said colors are encoded as follows:
00 if Dist_ij<=(Length)
01 if (Length)<Dist_ij<=3*Length
10 if (3Length)<Dist_ij<=5*Length
11 if Dist_ij>5*Length.

15. The method of claim 1, wherein if a black color is detected, defining said length value (Length) as:

Length_$R$=(max_median$R$−min_median$R$)/4

Length_$G$=(max_median$G$−min_median$G$)/4

Length_$B$=(max_median$B$−min_median$B$)/4

Length=$\sqrt{(|Length\_R|^2+|Length\_G|^2+|Length\_B|^2)}$ where max_medianR,G,B and min_medianR,G,B are the representative colors for the selected groups belonging to said sets for said color components (R, G, B)
and said colors are encoded as follows:
00 if R$_{ij}$=Gij=Bij=0
else if R$_{ij}$ or Gij or Bij not equal to 0
01 if Dist ij<=(Length)
10 if (Length)<Dist ij<=3*Length
11 if (3*Length)<Dist ij.

16. The method of claim 14, further comprising decoding said colors as:
if the code is 00
Rij=min_medianR
Gij=min_medianG
Bij=min_medianB
if the code is 01
Rij=min_medianR+2*length_R
Gij=min_medianG+2*length_G
Bij=min_medianB+2*length_B
if the code is 10
Rij=min_medianR+4*length_R
Gij=min_medianG+4*length_G
Bij=min_medianB+4*length_B
if the code is 11
Rij=min_medianR+6*length_R
Gij=min_medianG+6*length_G
Bij=min_medianB+6*length_B.

17. The method of claim 15, further comprising decoding said colors as:
if the code is 00
Rij=0
Gij=0
Bij=0
if the code is 01
Rij=min_medianR
Gij=min_medianG
Bij=min_medianB
if the code is 10
Rij=min_medianR+2*length_R
Gij=min_medianG+2*length_G
Bij=min_medianB+2*length_B
if the code is 11
Rij=min_medianR+4*length_R
Gij=min_medianG+4*length_G
Bij=min_medianB+4*length_B.

18. A processor for texture compressing images having a plurality of color components (R, G, B), including defining color representatives for use in encoding, comprising:
means for defining groups of colors for each said color component (R, G, B); and
means for selecting, for each said group of colors, a representative median color;
means for computing a length value as a maximum quantization error adapted to be computed when pixel Pij colors are quantized during an encoding step;
means for computing a Euclidean distance based upon the color components of the pixel Pij at the position ij of said image; and means for encoding each color as a function of said length value and said Euclidean distance.

19. The processor of claim 18, wherein said processor comprises a dedicated processor.

20. The processor of claim 18, wherein said processor comprises a general-purpose processor.

21. A Computer-readable storage medium tangibly embodying a program of instructions executable by a computer wherein said program of instructions comprises a plurality of program codes for texture compressing images having a plurality of color components (R, G, B), including defining color representatives for use in encoding, said program when executed by the computer implements a method comprising:
defining groups of colors for each said color component (R, G, B); and selecting, for each said group of colors, a representative median color by
computing a length value as a maximum quantization error adapted to be computed when pixel Pij colors are quantized during an encoding step;
computing a Euclidean distance based upon the color components of the pixel Pij at the position ij of said image; and
encoding each color as a function of said length value and said Euclidean distance.

* * * * *